United States Patent [19]

Kanaya et al.

[11] Patent Number: 5,155,401
[45] Date of Patent: Oct. 13, 1992

[54] RECORDER MOTOR WITH ATTACHED ENCODER AND COVER

[75] Inventors: Shinichi Kanaya, Tokyo; Koji Tanaka; Shingo Sanbe, both of Yokohama; Shinichi Osada, Tokyo; Seiki Shiotsuki, Yokohama, all of Japan

[73] Assignees: Canon Kabushiki Kaisha; Canon Seiki Kabushiki Kaisha, both of Tokyo, Japan

[21] Appl. No.: 708,858

[22] Filed: May 31, 1991

[30] Foreign Application Priority Data

| Jun. 7, 1990 | [JP] | Japan | 2-149346 |
| Jun. 7, 1990 | [JP] | Japan | 2-149347 |
| Jun. 7, 1990 | [JP] | Japan | 2-149348 |
| Jun. 7, 1990 | [JP] | Japan | 2-149349 |
| Jun. 7, 1990 | [JP] | Japan | 2-149350 |
| Jul. 19, 1990 | [JP] | Japan | 2-191234 |

[51] Int. Cl.$^5$ .......... H02K 5/10; G01D 5/34; G05B 19/40
[52] U.S. Cl. .......... 310/89; 250/231.13; 310/43; 310/113
[58] Field of Search .......... 250/231.13, 231.14, 250/231.16, 231.18; 307/106; 310/43, 67 R, 68 R, 71, 89, 112, 168, 268, DIG. 6, 113; 346/140 R

[56] References Cited

U.S. PATENT DOCUMENTS

| 4,633,110 | 12/1986 | Genco et al. | 310/68 R |
| 4,794,250 | 12/1988 | Togami | 250/231.13 |
| 4,928,050 | 5/1990 | Torisawa et al. | 318/696 |
| 4,933,636 | 6/1990 | McGee | 250/231.13 |
| 4,963,808 | 10/1990 | Torisawa et al. | 318/696 |
| 4,988,905 | 1/1991 | Tolmie, Jr. | 310/68 B |

FOREIGN PATENT DOCUMENTS

84/00647  2/1984  Japan .......... 310/71

OTHER PUBLICATIONS

Epstein, "Economical, High-Performance Optical Encoders", hp Journal, Oct. 88, pp. 99-106.

Primary Examiner—Steven L. Stephen
Assistant Examiner—D. L. Rebsch
Attorney, Agent, or Firm—Fitzpatrick, Cella, Harper & Scinto

[57] ABSTRACT

A recorder motor with an encoder, for forming an image on a record medium in accordance with image information, has the encoder on the outside of the motor case and a plastic dust-proof cover for the encoder mounted on the case. Thus, contamination by dust or ink mist is prevented, and stable and high precision motor rotation is maintained.

8 Claims, 6 Drawing Sheets

RECORDER MOTOR WITH ATTACHED ENCODER AND COVER

BACKGROUND OF THE INVENTION

1. Field of the Invention

The present invention relates to a stepping motor used as a drive source of a recorder having an image forming function such as a facsimile device, a copying machine or a printer, and more particularly to mounting of an encoder on such a stepping motor and a dust-proof structure of the encoder.

2. Related Background Art

U.S. Pat. No. 4,963,808 discloses mounting of an encoder, on a stepping motor. In this stepping motor, an encoder having to-be-detected areas which are equal in number to an integer multiple of the number of magnet poles of a rotor, is secured to a shaft of the rotor, and the number of to-be-detected areas of the encoder is counted at a predetermined position in a stator as the rotor is rotated so that energization of coils of the stator is switched when the count reaches a predetermined value.

U S. Pat. No. 4,928,050 discloses a printer which uses such a stepping motor having an encoder. In this printer, the stepping motor is used as a drive source to drive a record head for scanning. The printer comprises detection means for detecting a rotation angle position of a rotor of the stepping motor and control means for closed-loop controlling the drive of the stepping motor in accordance with the detection output of the detection means.

In each of the above stepping motors, the encoder of the stepping motor is assembled in a dust-proof case.

In such a motor with the encoder, a sensor, such as a photo-interruptor, is positioned and fixed or a stationary mount such as a motor case, and a coded disk such as a slitted disk is positioned and fixed to a motor shaft.

Since the sensor, such as a photo-interruptor, is positioned and fixed to a mount plate secured to the motor case by fastening means such as screws, the position tolerance between the motor case and the motor shaft as well the position tolerance between the motor case and the mount plate are accumulated, so that an accumulated relative position error between the coded disk and the sensor increases, and it is difficult to attain a sufficiently high detection precision of the motor rotation position.

In such a motor with the encoder, when the coded disk such as slitted disk is to be secured to the motor shaft, a receiving member having a receiving plane for positioning the encoding disk and a center boss is press-fitted to the motor shaft, the disk is fitted to the receiving member, and a washer is coupled to the receiving member by a bolt to secure the coded disk.

In such prior art method for securing the encoder, the number of steps for securing the coded disk such as slitted disk is large, the work is complex, and the cost is high.

Further, motor terminals are connected to a motor terminal board or lead wires, encoder terminals are connected to other lead wires and they are taken out separately. Accordingly, the structure of connection of the lead wires of the motor is complex and the assembling takes a long time.

When the sensor is to be mounted on the motor case, a positioning area such as a projection or a recess is provided on a motor outer tube, and the sensor is positioned and clamped by screws. Alternatively, the sensor is mounted by using a motor mount plate and lead wires are connected to input/output terminals of the sensor. Accordingly, the costs of parts are high and the number of steps of assembling is large.

On the other hand, because the magnetic field generation means and the excitation means of the motor generate heat when the motor is driven, it is necessary to secure heat dissipation in case of continuous operation or an operation in a high temperature environment.

In a compact size motor such as a stepping motor, there is no space to accommodate a fan or cooling medium, and the heat is dissipated to the air by conducting the heat to the outside through the motor shaft or the motor case.

In the prior art compact size motor, however, a heat dissipation plate is separately mounted on the surface of the motor case to enhance the heat dissipation effect. As a result, the number of parts increases, the number of assembling steps increases, and the size of the motor increases.

SUMMARY OF THE INVENTION

It is a first object of the present invention to provide a proper construction of a dust proof case of an encoder of a motor used for a recorder.

It is a second object of the present invention to facilitate mounting of a coded/disk to a motor shaft.

It is a third object of the present invention to position and fix a sensor to a motor case.

It is a fourth object of the present invention to provide motor terminals and encoder terminals on the same board.

It is a fifth object of the present invention to enhance the heat dissipation effect of the motor.

It is a sixth object of the present invention to mount a sensor on a motor terminals board.

DETAILED DESCRIPTION OF THE PREFERRED EMBODIMENTS

Embodiments of the present invention will be explained in detail with reference to the drawings.

Figure 14:
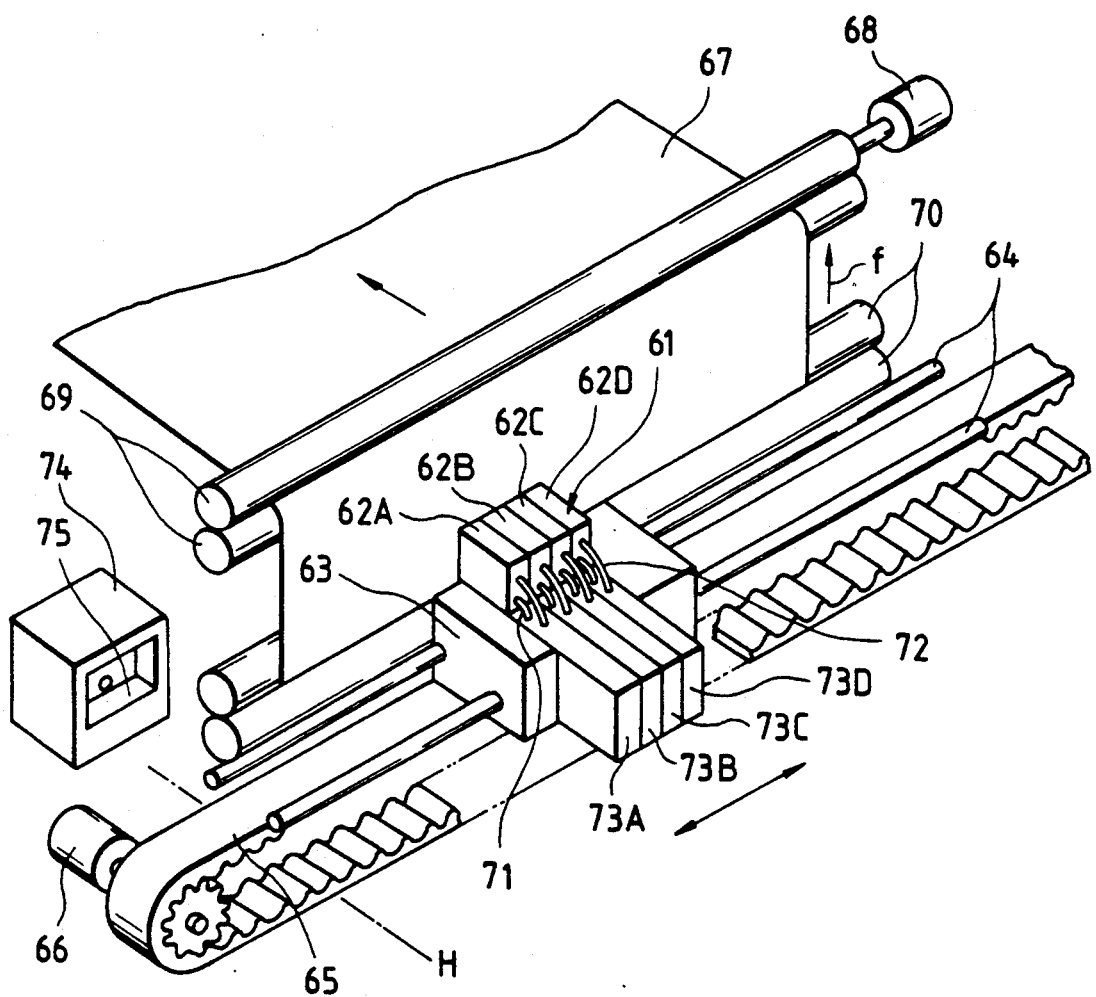
FIG. 14 shows a perspective view of major portions of a recorder having the motor with the encoder of the present invention.

FIG. 14 shows a perspective view of major portions of a recorder having a motor with an encoder in accordance with the present invention.

In FIG. 14, the head unit 61 mounted on carriage 63 has a plurality of (four in the illustrated embodiment) record heads 62A, 62B, 62C and 62D.

A plurality of discharge ports are arranged in a predetermined arrangement on discharge planes (facing a record medium) of the record heads 62A to 62D.

Inks of different colors are discharged from the discharge ports of the record heads 62A to 62D. For example, in a full color ink jet recorder, the record heads 62A to 62D form monochromic patterns of yellow, magenta, cyan and black, and over-printing of those monochromic patterns is controlled to record a color image of desired colors.

The record heads 62A to 62D may be ink jet record heads which discharge inks by utilizing thermal energy, and they comprise electro-thermal transducers to generate the thermal energy. The inks are discharged from the discharge ports for recording by growing air bubbles by film boiling caused by the thermal energies applied by the electro-thermal transducers.

In FIG. 14, the carriage 63 which mounts the head unit 61 thereon is movable along a guide rail 64 and reciprocally driven by a carriage motor 66 through a timing belt 65.

The carriage motor 66 has an encoder and may be a stepping motor with the encoder.

A sheet-like record medium 67 such as a form or a plastic sheet is fed in a direction of an arrow fat a predetermined timing and a predetermined pitch along a predetermined path by a pair of feed rollers 69 driven by a feed motor 68 and a pair of cooperating holding rollers 70.

The feed motor 68 also has an encoder and, it may be, a stepping motor with the encoder.

The carriage motor 66 is driven while the record medium 67 is held flat at a record position facing the record heads 62A to 62D so that recording is effected by main scan of the record heads 62A to 62D. After one line has been recorded, the feed motor 68 is driven to feed the record medium by one pitch in the direction f so that the recorder is ready to record the next line.

Ink tanks 73A to 73D for supplying the inks of designated colors to the record heads 62A to 62D are detachably mounted in the carriage 63.

The recording heads 62A to 62D and the ink tanks 73A to 73D are connected by an ink supply tube 71 and an ink return tube 72.

A home position H is set at a predetermined position within the movement range of the carriage 63 and outside of a record area. A recovery device 74 for recovering non-discharge of the inks by the record heads 62A to 62D is arranged at the home position H.

The recovery device 79 is movable back and forth and a cap 75 for closing discharge planes (on which the discharge ports are formed) of the record heads 62A to 62D is arranged on a front surface of the recovery device 74.

The recovery device 74 is arranged at the position at which it faces the record heads 62A to 62D when the carriage 63 is at the home position H. It functions to cap the discharge ports after the recording, receive the ink discharged from the record heads without depositing on the record medium and effects a pressurized circulation operation of the inks for the record heads for recovering the non-discharge of the inks.

A recovery motor (not shown) is used as a drive source to the recovery device 74, and it may also be a motor with an encoder.

Not all of the carriage motor 66, the feed motor 68 and the recovery motor need be the motors with the encoders but only the required ones may be the motors with the encoders.

Where motors other than those described above are needed, a motor with an encoder may be used.

Figure 1:
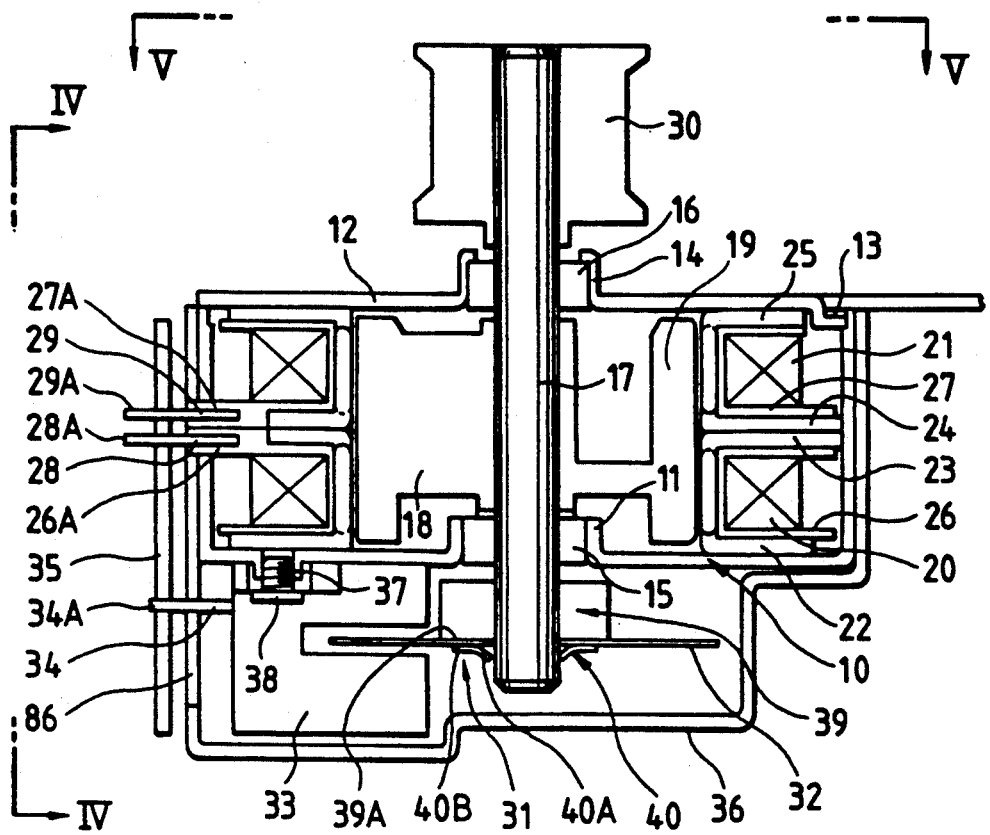
FIG. 1 shows a longitudinal sectional view of one embodiment of a motor with an encoder for use in a recorder, in accordance with the present invention.

FIG. 1 shows a longitudinal sectional view of one embodiment of a motor with an encoder for a recorder such as the carriage motor 66, the feed motor 68 or the recovery motor.

In FIG. 1, a bearing housing 11 is formed at a center of a drum-shaped motor case 10 having an open end. A mount plate 12 is secured to the open end of the motor case 10 by securing means such as a calking 13, and another bearing housing 14 is formed at a motor shaft center of the mount plate 12.

The mount plate 12 also serves as an end plate to close the open end of the motor case 10.

A motor shaft 17 is supported by bearings 15 and 16 which are press-fitted and secured to the respective bearing housings 11 and 14.

A rotor 18 is press-fitted and secured to the motor shaft 17 in the motor case 10, and a rotor magnet 19 which is magnetized to N and S poles at a predetermined circumferential pitch is formed on an outer periphery of the rotor 18.

A yoke having pole teeth which face the rotor magnet 19 is arranged in the motor space defined by the motor case 10 and the mount plate 12, and two stacks of excitation coils 20 and 21 are arranged in the yoke.

The yoke comprises a first outer yoke 22 fixed to the end plane of the motor case 10, a first inner yoke 23 and a second inner yoke 24 bonded back to back, and a second outer yoke 25 fixed to an inner plane of the mount plate 12.

A first excitation coil 20 is mounted in the first inner and outer yokes 22 and 23 through a bobbin 26, and a second excitation coil 21 is mounted in the second inner and outer yokes 24 and 25 through a bobbin 27.

The bobbins 26 and 27 may be made of insulative material such as plastic and portions 26A and 27A thereof protrude from a side plane of the motor case 10. Motor terminals members 28 and 29 (four or six in total) connected to the excitation coils 20 and 21 are taken out of the protruded areas.

Rotary force take-out means such as a pulley is secured to the output protruded portion of the motor shaft 17.

An encoder 31 for detecting angle and speed of motor rotation is mounted on the outside of the motor case 10 opposite to the output side of the motor.

The encoder 31 comprises a coded disk 32 (for example, a disk coded by a slit pattern, a fringing pattern or a magnetic pattern) positioned and fixed to the portion of the motor shaft 17 which protrudes from the motor case 10, and a sensor 33 (for example, a photo-interruptor, a reflection type photo-electric sensor, or a magnetic sensor which senses the passage of the coded pattern when the motor is driven).

The sensor 33 is arranged on the same side as that of the motor terminal members 28 and 29, and a sensor terminal member 34 (which comprises four encoder terminal members for power supplies and signals) of the sensor 33 protrudes in the substantially same direction as that of the motor terminal members 28 and 29.

The terminal members, namely, the four or six motor terminal members 28 and 29 and the four sensor terminal member 34 which protrude to the substantially same side of the circumference of the motor are made of conductive rod-shaped or plate-like metals having a predetermined rigidity.

The motor terminal members 28 and 29 and the sensor terminal member 34 are secured to the same board 35, and all terminals formed at the end of the board, that is, the motor terminals 28A and 29A and the sensor terminal 34A are formed on the common board 35.

A plastic receiving member 39 having a receiving plane which is perpendicular to a shaft center is press-fitted and secured to the motor shaft 17 at a predetermined axial position, and the coded disk 32 having the center hole thereof press-fitted to the motor shaft 17 is press-contacted by a spring retaining ring 40 which is also press-fitted, to the receiving plane 39A of the receiving member 39, and positioned and secured.

The retaining ring 40 is formed with a spring 40A which is inclined to prevent escape and which has an end thereof fitted to the motor shaft 17 and a flat ring-shaped planar area 40B for uniformly press-contacting the coded disk 32 to the receiving plane 39A.

The coded disk 32 has a center hole thereof press-fitted so that the coaxiality to motor shaft 17 is secured, and it is further urged to the space between the receiving plane 39A of the receiving member 39 and the spring retaining ring 40 so that the perpendicularity to the motor shaft 17 and the axial position are precisely secured.

On the other hand, the sensor 33 has positioning projections formed at two points on the engaging surface fitted to the positioning holes formed at two points on the end plane of the motor case 10, and it is further positioned and secured at two other points (for example, two points on both sides) by a female thread 37 tapped at a burring area of the motor case 10 and a bolt 38 coupled to the female thread 37.

A dust-proof cover 36 for covering the encoder 31 is removably attached to the outer periphery of the motor case 10.

The dust-proof cover 36 is formed by plastic molding and it is removably attached to the motor case 10 by projection/recess engagement means by making use of the elasticity of the cover 36.

The dust-proof cover 36 serves to prevent the instability and inaccuracy of the feedback control for the rotation angle of the stepping motor due to dust clogged in the coded area (slit pattern or fringe pattern) formed on the coded disk 32.

Figure 2:
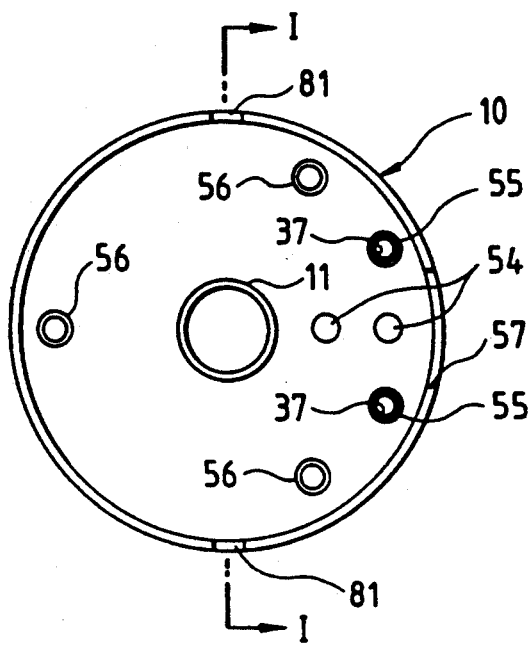
FIG. 2 shows a front view of a motor case shown in FIG. 1, as viewed from an open end.
Figure 3:
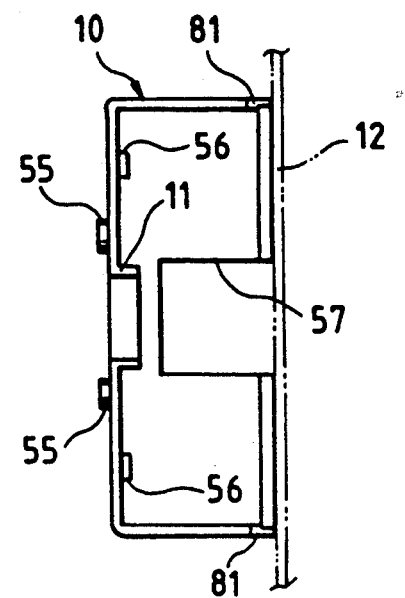
FIG. 3 shows a longitudinal sectional view taken along a line I—I of FIG. 2.
Figure 4:
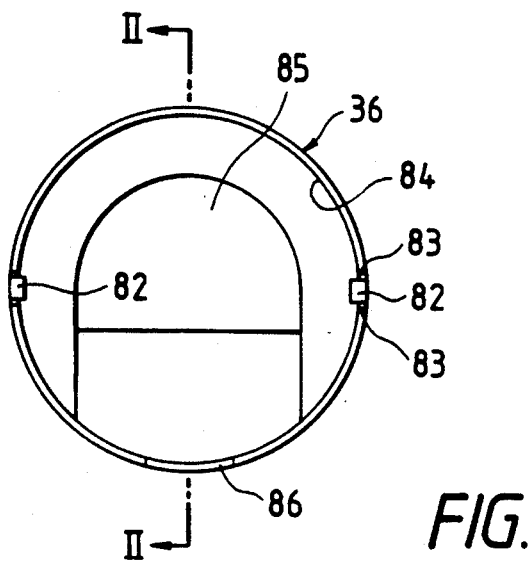
FIG. 4 shows a front view of a dust-proof cover shown in FIG. 1, as viewed from an open end.
Figure 5:
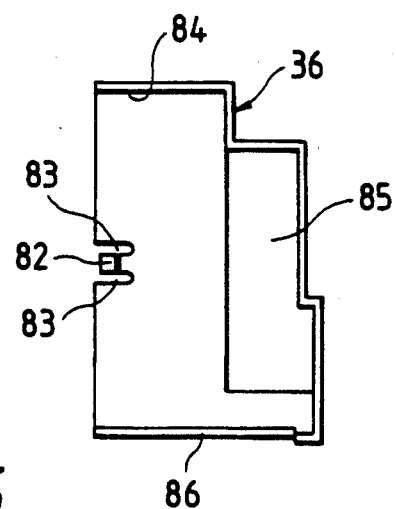
FIG. 5 shows a longitudinal sectional view taken along a line II—II of FIG. 4.
Figure 6:
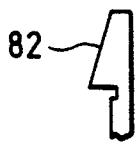
FIG. 6 shows a partial enlarged longitudinal sectional view for illustrating a shape of a projection for mounting the dust-proof cover of FIG. 4.
Figure 7:
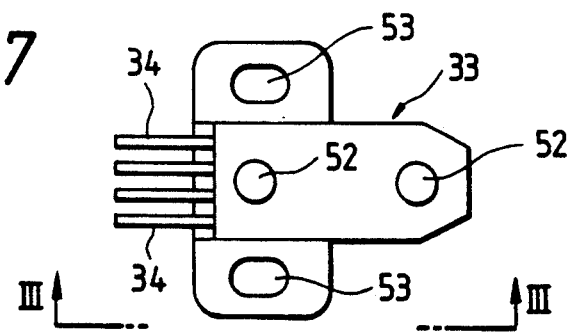
FIG. 7 shows a bottom view of a sensor shown in FIG. 1.
Figure 8:
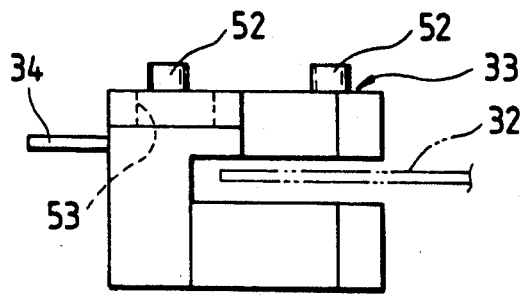
FIG. 8 shows a side view as viewed from a line III—III of FIG. 7.

FIG. 2 shows a front view of the motor case 10 as viewed from the open end, FIG. 3 shows a longitudinal sectional view taken along the line I—I of FIG. 2, FIG. 4 shows a front view of the dust-proof cover 36 as viewed from the open end, FIG. 5 shows a longitudinal sectional view taken along the line II—II of FIG. 4, FIG. 6 shows a projection for mounting the dust-proof cover, FIG. 7 shows a bottom view of the sensor (photo-interruptor) 33 as viewed from the mounting side, and FIG. 8 shows a side view as viewed from the line IV—IV of FIG. 7.

In FIGS. 2 to 8, positioning projections 52 (at two points) and mounting slots 53 (at two points) are formed on the mounting plane of the sensor 33, as shown in FIG. 7.

On the other hand, positioning holes 54 and burrings 55 are formed on the end plane of the motor case 10 to correspond to the projections 52 and the slots 53 o the sensor 33, as shown in FIG. 2.

The positioning holes 54 are formed at two points spaced by a predetermined interval radially of the motor, and the burrings 55 are formed on the opposite sides of a line which connects the two positioning holes 54.

The female threads 37 (FIG. 1) are formed by tapping in the inner peripheries of the burrings 55, and the sensor 33 is positioned and secured to the outer side of the end plane of the motor case 10 by clamping the slots 53 by the bolts 38 (FIG. 1). The two projections 55 are fitted to the two positioning holes 54, and the two slots 53 on the left and right sides thereof (substantially circumferentially opposite sides) are fitted to the two burrings 55, and the bolts 38 are coupled to the female threads 37 in the burrings through the slots 53 so that the sensor 33 is directly positioned and secured to the motor case 10.

Since the sensor 33 of the encoder 31 is directly positioned and secured to the motor case 10, the accumulated error to the coded disk 32 which is secured to the motor shaft 17 can be reduced and the relative positional precision (such as coaxiality, plurarity and axial position) between the sensor 33 and the coded disk 32 can be improved.

Numeral 56 in FIGS. 2 and 3 denotes burrings (at three points) for calking the first outer yoke 22 to the inner plane of the motor case 10, and numeral 57 denotes a notch for permitting the motor terminal members 28 and 29 to protrude from the motor case 10.

Notchs 81 for removably securing the dust-proof cover 36 are formed at two points on the circumference at the open end of the motor case 10 as shown in FIGS. 2 and 3.

On the other hand, projections 82 which are engageable with the notches 81 of the motor case 10 by snap action are formed at two points on the circumference in the vicinity of the open end of the dust-proof cover 36.

FIG. 6 shows a partial enlarged longitudinal sectional view which illustrates the shape of the projection 82.

As shown in FIGS. 4 to 6, the projection 82 has notches 83 on both sides thereof so that it forms an inward projection which is resiliently deformable radially outward.

The inner periphery 84 of the dust-proof cover 36 which is to be engaged with the motor case 10 have dimensions to assume the fitting to the outer periphery of the motor case 10 without substantial clearance therebetween. In the mounted position of FIG. 1, the two projections 82 are latched between the two notches 81 and the mount plate 12, and the dust-proof cover 36 is secured to the motor case 10 to prevent the axial and circumferential movement to the motor.

In the course of mounting the dust-proof cover 36 to the motor case 10, the projection 82 is elastically deformed radially so that it may be readily inserted to the predetermined position at which the projections 82 are latched.

When the dust-proof cover 36 is to be removed, it is pulled out while the projections 82 are opened from the end plane.

In FIGS. 4 and 5, a space 85 in the dust-proof cover 36 is a space to accommodate the encoder 31, and a notch 86 to permit the protrusion of the motor terminal members 28 and 29 and the encoder terminal 34 is formed on a side of the dust-proof cover 36.

As described above, since the coded disk 31 and the sensor 33 of the encoder 31 are mounted on the outside of the motor case 10 and the dust-proof cover 36 to cover the encoder 31 is removably attached to the motor case 10, the deposition of foreign materials such as paper flakes or ink mists produced in the recorder to the coded disk 32 or the sensor 33 is effectively prevented even if they are mounted in the recorder, and malfunction or instability in the position control of the record head or the record medium due to the misdetection such as skipping of the code by the encoder 31 due to the deposition of the foreign material are prevented. As a result, a recorder which can stably and finely record the image over an extended period of time without degradation of image quality due to the variation of the record position.

Since the dust-proof cover is easily removably attached to the outer periphery of the motor case 10, the motor with encoder for a recorder which is simple in construction and easy to handle is provided.

In the above embodiment, the motor with the encoder of the present invention is applied to the stepping motor for the ink jet type recorder, although the motor with the encoder of the present invention may also be applicable to a motor of a recorder of other type such as wire dot type, thermal type or laser beam type.

Further, the motor with the encoder of the present invention is applicable without regard to the number of record heads mounted in the recorder and applicable to a serial scan type in which the record head is mounted on the carriage 63, as well as other types such as line type, in which a line head extends over a width of the record medium 67. In those cases, the same effect as that of the above embodiment is attained.

Further, the present invention is applicable to the motor with the encoder having the coded disk and the sensor without regard to the type of encoder such as photo-interrupter type, light reflection type or magnetic type.

Since the encoder is arranged on the outside of the motor case and the dust-proof cover which covers the encoder is mounted on the motor case, contamination by dust or ink mists can be prevented and a the highly precise and stable motor rotation is maintained.

Further, since the sensor is positioned and secured to the motor case by the positioning holes and the mount plate formed on the motor case, the precision of the mount position of the sensor such as photo-interrupter to the coded disk on the motor shaft can be readily improved and the sensor can be secured with a simple and less expensive structure.

Figure 9:
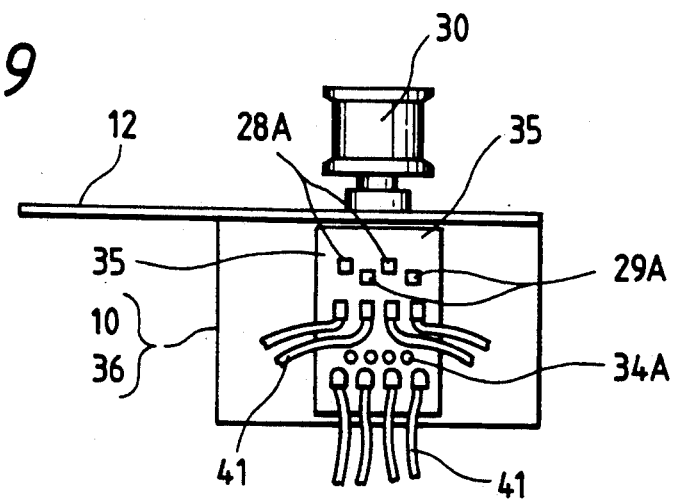
FIG. 9 shows a side view as viewed from a line IV—IV of FIG. 1.
Figure 10:
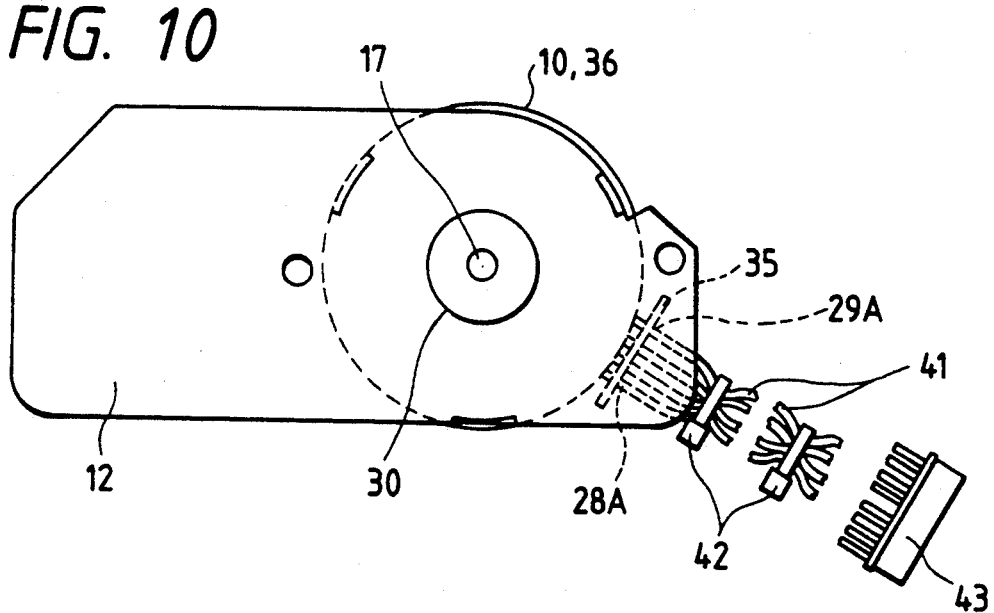
FIG. 10 shows an output end view as viewed from a line V—V of FIG. 1.

FIGS. 9 and 10 show a side view and a top view of the motor of FIG. 1. The motor terminal members 28 and 29 and the sensor terminal member 34 are secured to the same board 35 and all terminals formed at the ends thereof, that is, the motor terminals 28A and 29A and the sensor terminal 34A are provided on the common board 35.

The motor terminals 28A and 29A and the sensor terminal 34A are connected to the respective lead wires 41 through the circuits on the board 35. The connection may be made by conductive coupling by solder.

Numerals 42 and 43 in FIG. 3 denote wire binders which bind the lead wires 41, and numeral 43 denotes a connector of the lead wires 41.

The dust-proof cover 36 which covers the encoder 31 is removably attached to the outer periphery of the motor case.

Since the motor terminal members 28 and 29 and the encoder terminal member 34 protrude from the same side and the motor terminals 28A and 29A and the encoder terminals 34A are arranged on the same board 35, the connection with the lead wires 41 may be done by a compact and simple structure, the assembling workability is improved and the terminals 28A, 29A and 34A can be stably secured.

As described above, a stepping motor with the encoder of the present invention which comprises the coded disk secured to the motor shaft and the sensor for detecting the rotation angle of the coded disk, secured at the predetermined position on the motor case, has the motor terminals and the encoder terminals arranged on the same substrate. Accordingly, the terminals can be stably held and the connection of the lead wires of the motor can be made by a simple structure. Thus, the assembling workability of the stepping motor with the encoder is improved.

Figure 11:
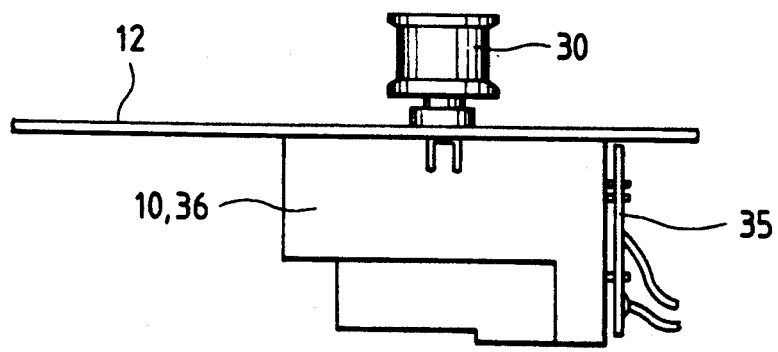
FIG. 11 shows a side view as viewed in a different direction from that of FIG. 9.

In FIGS. 9 to 11, the mount plate 12 has a shape to render a surface area thereof to be sufficiently large so that the heat conducted from the motor shaft 17 through the bearing 16 and the heat conducted from the motor case 10 can be effectively dissipated to the air.

The mount plate 12 is structured to independently function as a heat dissipation plate.

Further, the mount plate 12 is made of magnetic material such as steel because it forms a portion of the magnetic circuit of the motor.

In a compact size motor such as a stepping motor, the mount plate 12 may have a thickness of 0.8 mm and an area which is approximately two times or more as large as the area of the end plane of the motor case 10.

The surface of the mount plate 12 is plated with a highly conductive metal such as aluminum so that the contact resistance on the surface is reduced to permit the use thereof as a grounding member.

Since the mount plate 12 is usually bolted to a steel frame of the equipment such as printer, the highly conductive grounding member is provided by merely inserting the ground line of the motor between the mount plate 12 and the frame if the surface resistance is sufficiently small. Thus, the wiring structure can be simplified and assembly is facilitated.

Figure 12:
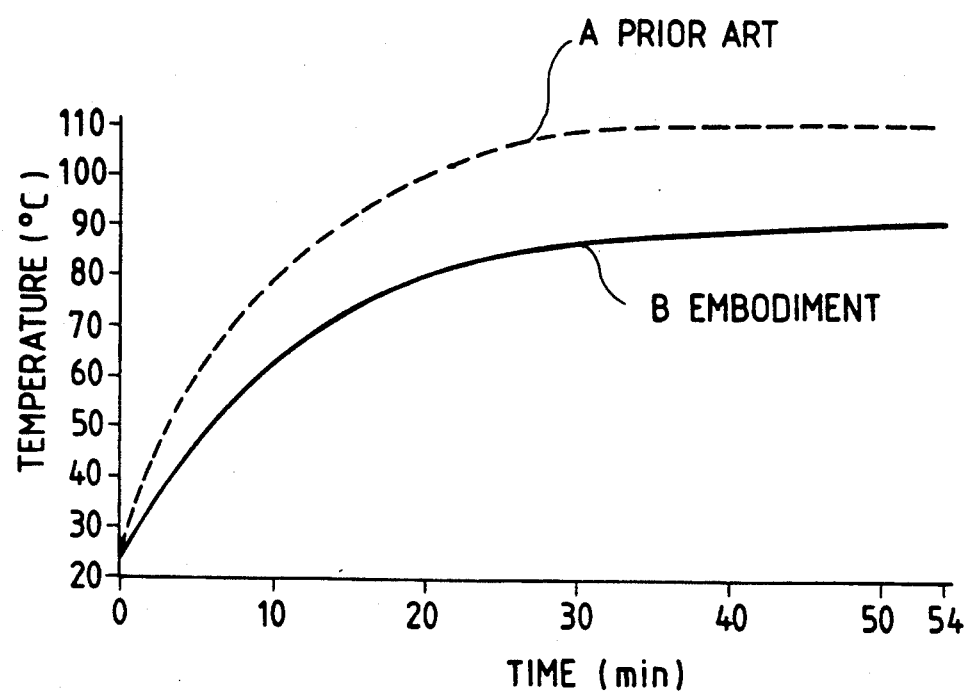
FIG. 12 shows a graph of comparison of heat dissipation effects in a compact size motor of FIG. 1 and a prior art motor.

FIG. 12 shows a graph of the changes of motor temperature in time under a continuous high speed operation for the stepping motor with the mount plate 12 and the same stepping motor with a mount plate having the substantially same area as that of the end plate of the motor.

In FIG. 12, a curve A is for the prior art motor and a curve B is for the embodiment.

As seen from the graph of FIG. 12, the compact size motor in accordance with the present invention can significantly improve the heat dissipation effect and the rise of the temperature of the motor can be reduced by approximately 20° C., compared to the prior art motor.

Because of the reduction of the temperature rise of approximately 20° C., the bobbins 26 and 27 may be made of material having a lower heat resistive temperature, and the cost of the motor can be reduced.

In the above embodiment, since the surface area of the mount plate 12 of the motor is large to increase the heat dissipation effect, the mount plate 12 itself may be used as the heat dissipation plate. Thus, the number of parts is reduced, the structure is simplified, the size is reduced and the cost is reduced while attaining the sufficient heat dissipation.

Further, since a highly conductive metal such as aluminum is plated on the surface of the mount plate 12, the heat dissipation is improved and the excellent grounding means can be easily provided.

As described above, the compact size motor of the present invention has the mount plate secured to the motor case, and the mount plate is made of the magnetic material and has large surface area to enhance the heat dissipation effect of the heat conducted through the motor shaft and the motor case. Accordingly, the heat dissipation effect can be sufficiently enhanced without increasing the number of parts or the number of steps.

Figure 13:
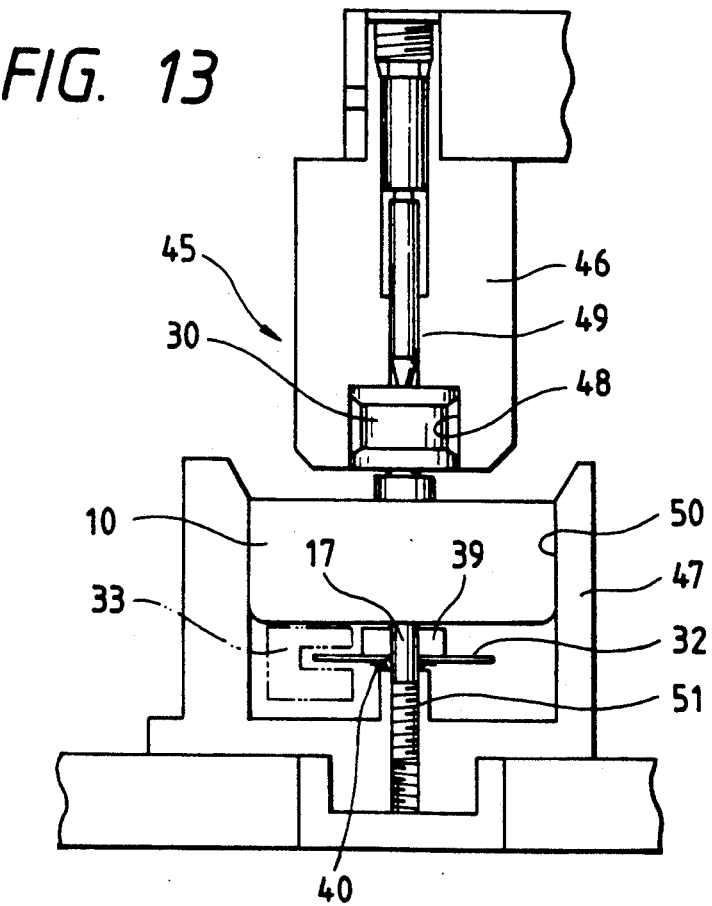
FIG. 13 shows a longitudinal sectional view of steps of mounting the encoder to the motor shaft shown in FIG. 1.

Referring to FIG. 13, the press-fit step for positioning and securing the coded disk 32 to the motor shaft 17 is explained.

In FIG. 13, a press-fit jig 45 for positioning and securing the coded disk 17 comprises a movable mold 46 fixed to a movable unit of a press machine and a stationary mold 47 fixed to a stationary unit of the press machine.

The movable mold 46 and the stationary mold 47 are arranged coaxially.

A motor body (a motor assembly prior to mounting of the encoder 31 or the coded disk 32) is mounted on the movable mold 46, and the retaining ring 40, the coded disk 32 and the receiving member 39 are mounted at the center of the stationary mold 47 in a superposition fashion. Then, the motor body is lowered to press-fit the motor shaft 17 to the members 39, 32 and 40. It is lowered to the predetermined axial position so that the coded disk 32 is positioned and secured.

In the illustrated embodiment, a hole 48 which fits to the pulley 30 of the motor body and a pin 49 for lowering the end of the motor shaft 17 are formed in the movable mold 46.

On the other hand, a guide hole 50 for guiding the outer periphery of the motor case 10 of the motor body is formed in the stationary mold 47.

A center guide 51 which positions and mounts the receiving member 39, the coded disk 32 and the retaining member 40 and has an inner diameter to permit the fitting of the end of the motor shaft 17 is formed at a bottom center of the guide hole 50.

In accordance with the press-fit jig 45 of FIG. 13, the retaining ring 40, the coded disk 32 and the receiving member 39 are mounted at the guide 51 in the stationary mold 47 in the superposition fashion. Thus, the coded disk 32 can be positioned and secured to the motor shaft 17 by merely lowering the movable mold 46 having the motor body mounted thereon to the predetermined axial position.

In this case, the coaxiality of the coded disk 32 is defined by the center hole of the coded disk 32, the perpendicularity is defined by the receiving plane 39A of the receiving member 39 and the retaining ring 40, and the axial position is defined by the press-fit position of the receiving member 39 (the amount of descent defined by the stopper). Accordingly, the coded disk 32 can be positioned and secured by only the press-fit step.

Since the spring 40A which is tapered to prevent escape is provided in the retaining ring 40, the spring-back after the press-fit can be prevented and the axial position of the coded disk 32 can be precisely defined.

Since the ring-shaped planar area 40B of the perfect circle is provided on the outer periphery of the retaining ring 40, the coded disk 32 can be uniformly urged to the receiving plane 39A so that the perpendicularity and the planarity of the coded disk 32 can be readily maintained.

In accordance with the present method for mounting the encoder on the motor, the center hole to which the motor shaft is press-fitted is formed in the coded disk, and the coded disk is held between the outer periphery of the retaining ring and the receiving plane of the receiving member by using the retaining ring which has the spring inclined to prevent escape and having the end to be press-fit to the motor shaft and the receiving surface perpendicular to the motor shaft, so that those three members are simultaneously press fit and positioned to the motor shaft. As a result, the number of steps required to mount the coded disk such as slitted disk on the motor shaft can be significantly reduced, the construction is simplified and the cost of the motor is reduced.

Figure 15:
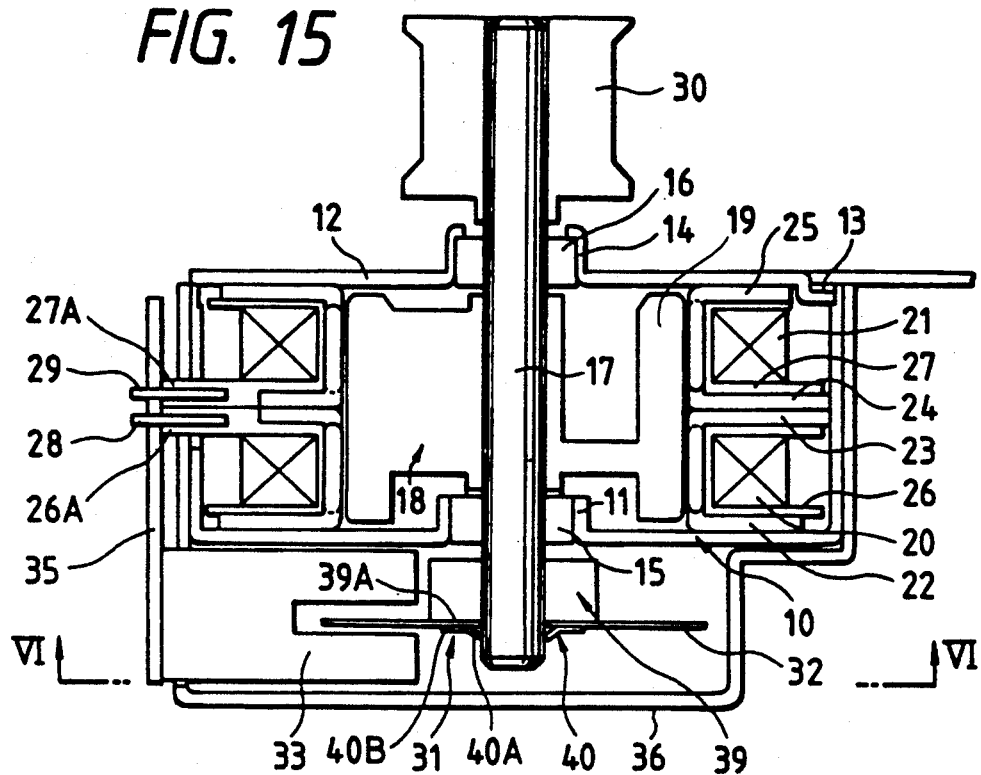
FIG. 15 shows a longitudinal sectional view of another embodiment of the stepping motor with the encoder of the present invention.
Figure 16:
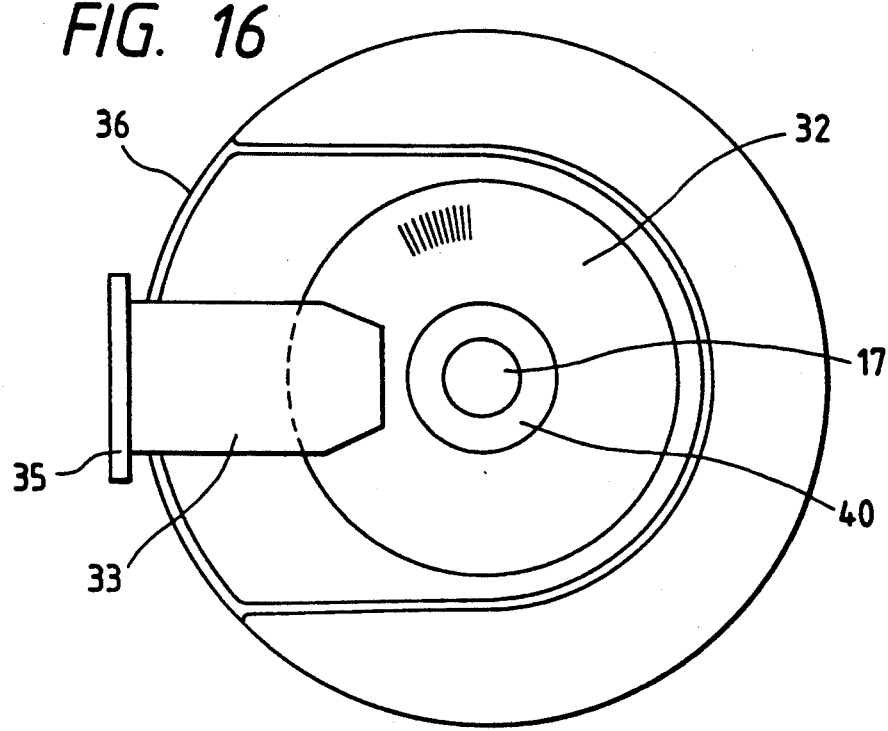
FIG. 16 shows a lateral sectional view taken along a line VI—VI of FIG. 15.

Another embodiment of the present invention is now explained with, reference to FIGS. 15 and 16. Elements similar to those of the first embodiment are designated by the like numerals and the explanation thereof is omitted. Only the different elements are explained below.

In FIGS. 15 and 16, the sensor 33 is arranged on the same side as the motor terminals 28 and 29, and directly secured to the circuit board 35.

In order to secure the sensor 33 to the circuit board 35, it is necessary to electrically connect the signal electrodes and the power supply electrodes of the sensor to the circuits on the circuit board while they are precisely positioned relative to the coded disk 32. Accordingly, the electrical connecting areas may be soldered while they are positioned by protrusion/recess fitting means.

It is also necessary to secure the circuit board 35 which supports the sensor 33 while it is positioned. If it is unstable by only the securing by the motor terminals 28 and 29, it may be reinforced by bolting it to the motor case 10.

The coded disk 32 is also secured to the motor shaft 17 at the precise position to the sensor 33.

In FIG. 15, the plastic receiving member 39 having the receiving plane 39A which is perpendicular to the shaft center is press-fitted and secured to the motor shaft 17 at the predetermined axial position. The coded disk 32 having the center hole press-fitted to the motor shaft 17 is press-fitted, positioned and secured to the receiving plane 39A of the receiving member 39 by the press-fitted spring retaining ring 40.

The retaining ring 40 has a spring 40A which is inclined to prevent the escape and an end to be press-fitted to the motor shaft 17, and a flat ring-shaped planar area 40B for permitting uniform press-fitting of the coded disk 32 to the receiving plane 39A.

The coaxiality of the coded disk 32 to the motor shaft 17 is secured by the press-fitting to the center hole formed in the coded disk 32, and the perpendicularity and the axial position to the motor shaft 17 are precisely maintained by urging the coded disk 32 to the area between the receiving plane 39A of the receiving member 39 and the spring retaining ring 40.

The dust-proof cover 36 prevents the instability and the inaccuracy of the feedback control of the rotation angle of the stepping motor due to the clogging of dust at the code area (slit pattern or fringe pattern) formed on the coded disk 32.

The coded disk 32 and the sensor 33 may be the combination of the slitted disk and the photo-interrupter as described above, or any other combination which electrically detects the motor rotation position or speed such as a combination of a disk having a fringe pattern and a reflection type photoelectric transducer or a combination of a magnetized disk and a magnetic sensor.

In the above embodiment, the circuit board 35 is secured to the motor terminals 28 and 29 by soldering, and the sensor 33 is directly secured to the circuit board 35 by soldering. Accordingly, it offers the following advantages.

i) The assembling steps such as the manufacturing and calking steps of the positioning means when it is secured to the sensor mount member, and the electrical connecting lead wires or the motor case can be omitted, and the number of parts and the number of steps is reduced compared to the prior art, and the cost is reduced.

ii) Since the sensor 33 is directly secured to the circuit board 35, the lead wires and the terminals may be omitted and the construction of the electrical connection of the sensor can be significantly simplified, and the size and the cost can be reduced.

As described above, in accordance with the stepping motor having the encoder which comprises a coded disk secured to the motor shaft and the sensor for detecting the rotation angle of the coded disk secured to the motor, the circuit board is secured to the motor terminals so that the sensor is directly secured to the circuit board. Accordingly, the cost of the sensor mount structure and the number of assembling steps can be reduced and a low cost stepping motor with the encoder is provided.

The first outer yoke 22 and the second outer yoke 25 are separately prepared and secured to the motor case 10 and the mount plate 12 in the embodiment, although they may be formed integrally with the motor case and the mount plate 12.

In the embodiments, the positioning hole 54 is a through hole although it may be a blind hole, so long as it permits the projection/recess engagement for positioning.

Further, in the embodiments, two positioning projections 52, two fitting holes 54, two mounting holes 53 and two burrings 55 are formed, although they may be one, or 3 or more, respectively.

The positions, shapes (particularly those of the positioning holes and the projections) and the numbers of those members may be appropriately determined.

What is claimed is:

1. A motor with an encoder for a recorder for forming an image on a record medium in accordance with image information, comprising:
    a motor having a rotary motor shaft thereof protruding from a closed end and an open end of a motor case;
    a mount plate serving as an end plate to close the open end of said motor case, the surface area of the mount plate being larger than the surface area of an end of the motor case and wherein said mount plate is composed of magnetic material, thereby enhancing the heat dissipation effect thereof;
    an encoder disposed outside the closed end of the motor case, said encoder including a coded disk secured to said rotary motor shaft and a sensor secured to said motor case for detecting coded information of said coded disk; and
    a dust-proof cover for covering said encoder, said dust-proof cover being a plastic mold and having an engagement area which is to be engaged with the motor case by utilizing elasticity of the plastic.

2. A motor with an encoder according to claim 1 further comprising a motor terminal, wherein said encoder has an encoder terminal, and said motor terminal and said encoder terminal are arranged on one board.

3. A motor with an encoder according to claim 1 wherein said dust-proof cover covers an outer periphery of said motor case.

4. A motor with an encoder according to claim 1 wherein said motor case has a positioning hole and a mount area, and said sensor is positioned and mounted by said positioning hole and said mount area.

5. A motor with an encoder according to claim 5 wherein said mount plate has a plated layer of a highly conductive metal such as aluminum formed thereon for use as a grounding member.

6. A motor with an encoder for a recorder for forming an image on a record medium in accordance with image information, comprising:
    a motor having a rotary motor shaft protruding from a closed end and an open end of a motor case;
    a mount plate serving as an end plate to close the open end of said motor case, the surface area of the mount plate being larger than the surface area of an end of the motor case and wherein said mount plate is composed of magnetic material, thereby enhancing the heat dissipation effect thereof;
    an encoder disposed outside the closed end of the motor case, said encoder including a coded disk secured to said rotary motor shaft and a sensor for detecting coded information of said coded disk;
    a dust-proof cover for covering said encoder, said dust-proof cover being a plastic mold and having an engagement area which is to be engaged with the motor case by utilizing the elasticity of the plastic; and
    a circuit board secured to a motor terminal of said motor, said sensor being secured to said circuit board.

7. As stepping motor with an encoder comprising:
    a motor having a rotary motor shaft protruding from a closed end and an open end a motor case;
    a mount plate serving as an end plate to close the open end of said motor case, the surface area of the mount plate being larger than the surface area of an end of the motor case and wherein said mount plate is composed of magnetic material, thereby enhancing the heat dissipation effect thereof;
    an encoder disposed outside the closed end of the motor case, said encoder including a coded disk secured to said rotary motor shaft and a sensor for detecting coded information of said coded disk;

a dust-proof cover for covering said encoder, said dust-proof cover being a plastic mold and engages the motor case by utilizing elasticity of the plastic;

a retaining ring press-fitted to said rotary motor shaft, said retaining ring preventing escape of said coded disk; and a receiving member press-fitted to said rotary motor shaft, said receiving member holding said coded disk between itself and said retaining ring and being press-fitted and positioned to said rotary motor shaft simultaneously with said coded disk and said retaining ring.

8. A stepping motor with an encoder according to claim 7 wherein said retaining ring has a spring having an end thereof press-fitted to said rotary motor shaft and a flat outer periphery for urging said coded disk.

* * * * *

UNITED STATES PATENT AND TRADEMARK OFFICE
CERTIFICATE OF CORRECTION

PATENT NO.   : 5,155,401
DATED        : October 13, 1992
INVENTOR(S)  : SHINICHI KANAYA, ET AL.

It is certified that error appears in the above-indentified patent and that said Letters Patent is hereby corrected as shown below:

ON THE TITLE PAGE:

[56] REFERENCES CITED

Insert: --5,057,684 10/1991 Service--.

On the title page, In the Abstract:

Line 5, "the" should read --the motor--.

COLUMN 1

Line 43, "well" should read --well as--.

COLUMN 3

Line 47, "arrow fat" should read --arrow f at--.

COLUMN 7

Line 38, "ink jet" should read --ink-jet--.

Line 58, "the" should be deleted.

UNITED STATES PATENT AND TRADEMARK OFFICE
CERTIFICATE OF CORRECTION

PATENT NO. : 5,155,401
DATED : October 13, 1992
INVENTOR(S) : SHINICHI KANAYA, ET AL.

It is certified that error appears in the above-identified patent and that said Letters Patent is hereby corrected as shown below:

COLUMN 10

Line 28, "press fit" should read --press-fit--.

Line 35, "with.," should read --with--.

Line 37, "the" (first occurrence) should be deleted.

Line 51, "the" (first occurrence) should be deleted.

COLUMN 12

Line 16, "claim 1" should read --claim 1,--.

Line 20, "claim 1" should read --claim 1,--.

Line 23, "claim 1" should read --claim 1,--.

Line 27, "claim 5" should read --claim 1,--.

UNITED STATES PATENT AND TRADEMARK OFFICE
CERTIFICATE OF CORRECTION

PATENT NO. : 5,155,401
DATED : October 13, 1992
INVENTOR(S) : SHINICHI KANAYA, ET AL It is certified that error appears in the above-indentified patent and that said Letters Patent is hereby corrected as shown below:

COLUMN 14

Line 5, "claim 7" should read --claim 7,--.

Signed and Sealed this

Fourteenth Day of December, 1993

Attest:

BRUCE LEHMAN

Attesting Officer   Commissioner of Patents and Trademarks